United States Patent
Wang et al.

(10) Patent No.: US 9,319,185 B2
(45) Date of Patent: Apr. 19, 2016

(54) METHOD, ARRANGEMENT AND DETECTOR FOR DETECTING HYBRID AUTOMATIC REPEAT REQUEST ACKNOWLEDGEMENT INFORMATION

(75) Inventors: Hai Wang, Beijing (CN); Peng Li, Beijing (CN); Shaowei Yu, Beijing (CN); Ruiqi Zhang, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/401,705

(22) PCT Filed: May 28, 2012

(86) PCT No.: PCT/CN2012/076166
§ 371 (c)(1),
(2), (4) Date: Nov. 17, 2014

(87) PCT Pub. No.: WO2013/177738
PCT Pub. Date: Dec. 5, 2013

(65) Prior Publication Data
US 2015/0172006 A1    Jun. 18, 2015

(51) Int. Cl.
*H04W 4/00* (2009.01)
*H04L 1/18* (2006.01)
(Continued)

(52) U.S. Cl.
CPC ............ *H04L 1/1887* (2013.01); *H04L 1/0073* (2013.01); *H04L 1/1607* (2013.01); *H04L 1/1812* (2013.01); *H04L 1/1829* (2013.01); *H04L 5/0055* (2013.01); *H04W 72/0413* (2013.01); *H04W 72/12* (2013.01); *H04W 88/08* (2013.01)

(58) Field of Classification Search
None
See application file for complete search history.

(56) References Cited

U.S. PATENT DOCUMENTS

2005/0250497 A1*  11/2005  Ghosh .................... H04L 1/16
                                                                455/436

FOREIGN PATENT DOCUMENTS

| CN | 101300762 A | 11/2008 |
| CN | 102142946 A | 8/2011 |
| EP | 2326037 A1 | 11/2009 |

OTHER PUBLICATIONS

3rd Generation Partnership Project, "3rd Generation Partnership Project; Technical Specification Group Radio Access Network; Evolved Universal Terrestrial Radio Access (E-UTRA); Physical Channels and Modulation (Release 9)", Technical Specification, 3GPP TS 36.211 V9.1.0, Mar. 1, 2010, pp. 1-85, 3GPP, France.

(Continued)

Primary Examiner — Jutai Kao
(74) Attorney, Agent, or Firm — Coats & Bennett, PLLC

(57) ABSTRACT

Wireless communications may benefit from a method, an arrangement, and a detector for detecting HARQ-ACK information. According to embodiments of the present invention, the method comprises extracting a HARQ-ACK symbol sequence in data transmitted from a user equipment. The method also comprises generating a plurality of candidate HARQ-ACK symbol sequences. The method further comprises calculating a degree of similarity between each of the plurality of candidate HARQ-ACK symbol sequences and the extracted HARQ-ACK symbol sequence to obtain a plurality of degrees of similarity. The method additionally comprises comparing an extremum of the plurality of degrees of similarity with a predetermined threshold. Furthermore, the method comprises determining, based upon the comparing, whether the HARQ-ACK information has been transmitted from the user equipment.

20 Claims, 6 Drawing Sheets

(51) Int. Cl.
*H04L 1/00* (2006.01)
*H04L 1/16* (2006.01)
*H04L 5/00* (2006.01)
*H04W 72/04* (2009.01)
*H04W 72/12* (2009.01)
*H04W 88/08* (2009.01)

(56) References Cited

OTHER PUBLICATIONS

3rd Generation Partnership Project, "3rd Generation Partnership Project; Technical Specification Group Radio Access Network; Evolved Universal Terrestrial Radio Access (E-UTRA); Multiplexing and channel coding (Release 9)", Technical Specification, 3GPP TS 36.212 V9.3.0, Sep. 1, 2010, pp. 1-61, 3GPP, France.

3rd Generation Partnership Project, "3rd Generation Partnership Project; Technical Specification Group Radio Access Network; Evolved Universal Terrestrial Radio Access (E-UTRA); Base Station (BS) conformance testing (Release 9)", Technical Specification, 3GPP TS 36.141 V9.6.0, Dec. 1, 2010, pp. 1-179, 3GPP, France.

Motorola, "ACK/NACK DTX detection in PUSCH", 3GPP TSG RAN1#53bis, Jun. 30-Jul. 4, 2008, pp. 1-3, Warsaw, Poland, R1-082336.

Qualcomm Europe, "Single Code HS-DPCCH ACK/NACK Design for DC-HSDPA", 3GPP TSG-RAN WG1 #54bis, Sep. 28-Oct. 3, 2008, pp. 1-14, Prague, Czech Republic, R1-083961.

* cited by examiner

METHOD, ARRANGEMENT AND DETECTOR FOR DETECTING HYBRID AUTOMATIC REPEAT REQUEST ACKNOWLEDGEMENT INFORMATION

FIELD OF THE INVENTION

Exemplary embodiments of the present invention generally relate to wireless communication techniques including the 3GPP (the 3rd Generation Partnership Project) LTE (Long Term Evolution) technique. More particularly, exemplary embodiments of the present invention relate to a method, an arrangement, and a detector for detecting hybrid automatic repeat request acknowledgment information.

BACKGROUND OF THE INVENTION

Various abbreviations that appear in the specification and/or in the drawing figures are defined as below:
ACK Acknowledgement
BS Base Station
CQI Channel Quality Indicator
CRC Cyclic Redundancy Check
CSI Channel State Information
CSR Channel State Report
CM Cubic Metric
DTX Discontinuous Transmission
DL Downlink
eNB evolved Node B
HARQ Hybrid Automatic Repeat Request
IDFT Inverse Discrete Fourier Transform
IRC Interference Rejection Combining
ML Maximum Likelihood
MMSE Minimum Mean Square Error
MRC Maximal Ratio Combining
MSC Modulation and Coding Scheme
NAS Non Access Stratum
PDCCH Physical Dedicated Control Channel
PDSCH Physical Downlink Shared Channel
PMI Precoding Matrix Indicator
PN Pseudo Noise
PUCCH Physical Uplink Control Channel
PUSCH Physical Uplink Shared Channel
QAM Quadrature Amplitude Modulation
QPSK Quadrature Phase Shift Keying
RB Resource Block
RE Resource Element
RI Rank Indication
RRC Radio Resource Control
SCH Synchronization Channel
SINR Signal to Interference plus Noise Ratio
SR Scheduling Request
TS Technical Specification
UCI Uplink Control Information
UE User Equipment
UL Uplink In a current LTE system, a UL control signal may be transmitted by two methods. In the first method, the UL control signal is transmitted on a PUCCH which can only be transmitted on those subframes that have not been scheduled to a PUSCH. The PUCCH supports a number of formats such that it can carry different types of control information, which may include but not limited to a HARQ-ACK, an SR, and a CSR including e.g., a CQI, an RI, and a PMI.

Unlike the first method, in the second method, the UL control signal at issue is transmitted on one subframe which has been scheduled for transmission of the PUSCH. In this case, the UL control signal will be multiplexed with a UL-SCH before DFT operations to reduce a CM for keeping properties of a single carrier. The second method is also referred to as UCI on PUSCH. The UCI, such as the CQI/PMI, HARQ-ACK, and RI, would be multiplexed with the PUSCH on a subframe.

When the PUSCH is employed to transmit the UL control information, the CSRs may be on an aperiodic basis, where an eNB requests CSRs from a UE by setting a CSI request bit in a scheduling grant. Since the CSRs have been explicitly requested by the eNB, their existence is known and appropriate rate de-matching can be done at the receiver. If one of configured transmission instances for a periodic report coincides with the UE being scheduled on the PUSCH, the periodic report is "rerouted" and transmitted on the PUSCH. Also, in this case, there is no risk of mismatch in rate matching; the transmission instants for periodic reports are configured by robust RRC signaling and thus the eNB knows exactly in which subframes such reports will be transmitted.

In contrast to the CSRs, a robust QPSK modulation is generally applied to one or two HARQ-ACK bits and these HARQ-ACK bits generally occupy the outermost constellation points for the PUSCH data symbols, regardless of the modulation scheme used for the data.

By virtue of a previous scheduling assignment on the PDCCH, the eNB knows when to expect a HARQ-ACK from the UE and can therefore perform appropriate demultiplexing of the HARQ-ACK part and data part. However, there is a certain probability that the UE may miss the scheduling assignment on the PDCCH, in which case the eNB will expect a HARQ-ACK from the UE while the UE cannot transmit one due to the previous missed scheduling assignment. If the rate-matching pattern were to depend on whether a HARQ-ACK has been transmitted or not, all the coded bits transmitted in the data part could be affected by a missed scheduling assignment, in which case it is likely to cause UL-SCH decoding to fail. To avoid such a failure, a possible approach is to puncture the HARQ-ACKs into a coded UL-SCH bit stream and thereby non-punctured bits would not be affected by the presence/absence of the HARQ-ACKs. Further, the potential problem of a mismatch between the rate matching in the UE and the eNB may be avoided.

To eliminate the impact due to a possibly missed scheduling assignment on the PDCCH, the 3GPP technique requires that the HARQ-ACK false detection probability as well as the HARQ-ACK missed detection probability, when multiplexed on the PUSCH, shall not exceed 1% at PUSCH power settings presented in table 8.2.5.3.1 in TS 36.141. This requirement poses a task to perform a DTX detection on HARQ-ACKs to ascertain or detect the presence/absence of HARQ-ACKs multiplexed on the PUSCH, which is not a trivial challenge.

For the UCI on PUSCH as discussed before, a possible DTX detection approach may involve applying an existing demodulation solution to perform soft demodulations and get soft bits for all REs of the used RBs on one subframe, sorting out the soft bits for each type of information, including the PUSCH data, HARQ-ACK, CQI/PMI, RI or the like, and feeding those sorted out bits into a corresponding detection module for a DTX detection.

In the above DTX detection approach, all the HARQ-ACK soft bits would be used to obtain a metric and then compare the metric with a threshold to detect whether the HARQ-ACK has been transmitted or not. The selection of a proper threshold may heavily rely upon extensive PUSCH link level simulations, which are rather static and not adaptive enough towards any combinations of the allocated bandwidth, MCS, SINR and beta offset. It is shown by the PUSCH link level simulations that the soft bits based solution cannot meet the requirements of the HARQ-ACK error detection probability performance or the HARQ-ACK false alarm probability performance, which has been specified in 3GPP TS 36.141, v9.6.0, section 8.2.3.

SUMMARY OF THE INVENTION

It is the object to address at least some of the above disadvantages and provide an improved method, an arrangement, and a detector for detecting HARQ-ACK information.

According to an embodiment of the present invention, a method for detecting HARQ-ACK information is provided, which comprises extracting a HARQ-ACK symbol sequence in data transmitted from a UE. The method also comprises generating a plurality of candidate HARQ-ACK symbol sequences. The method further comprises calculating a degree of similarity between each of the plurality of candidate HARQ-ACK symbol sequences and the extracted HARQ-ACK symbol sequence to obtain a plurality of degrees of similarity. The method additionally comprises comparing an extremum of the plurality of degrees of similarity with a predetermined threshold. Furthermore, the method comprises determining, based upon the comparing, whether the HARQ-ACK information has been transmitted from the UE.

One embodiment of the present invention provides an arrangement in a BS for detecting HARQ-ACK information. The arrangement comprises an extractor for extracting a HARQ-ACK symbol sequence in data transmitted from a UE. The arrangement also comprises a generator for generating a plurality of candidate HARQ-ACK symbol sequences. The arrangement further comprises a calculator for calculating a degree of similarity between each of the plurality of candidate HARQ-ACK symbol sequences and the extracted HARQ-ACK symbol sequence to obtain a plurality of degrees of similarity. The arrangement additionally comprises a comparator for comparing an extremum of the plurality of degrees of similarity with a predetermined threshold. Furthermore, the arrangement comprises a determiner for determining, based upon the comparing, whether the HARQ-ACK information has been transmitted from the UE.

A further embodiment of the present invention provides a detector for detecting HARQ-ACK information. The detector comprises at least one processor. The detector further comprises at least one memory storing program of computer executable instructions, and the computer executable instructions configured, with the at least one processor, to cause the detector to at least perform according to the methods as discussed above and hereinafter.

With embodiments of the present invention, HARQ-ACK information can be efficiently and accurately detected without engendering excessive computational costs.

BRIEF DESCRIPTION OF THE DRAWINGS

The embodiments of the present invention that are presented in the sense of examples and their advantages are explained in more detail below with reference to the accompanying drawings, in which.

DETAILED DESCRIPTION OF EMBODIMENTS

While the making and using of various embodiments of the present invention are discussed in detail below, it should be appreciated that the present invention provides many applicable inventive aspects that can be embodied in a wide variety of specific contexts. The specific embodiments discussed herein are merely illustrative of specific ways to make and use the invention and do not delimit the scope of the invention.

To facilitate the understanding of embodiments of the present invention, a number of terms are defined below. Terms defined herein have meanings as commonly understood by a person of ordinary skill in the areas relevant to the present invention. Terms such as "a," "an" and "the" are not intended to refer to only a singular entity, but include the general class of which a specific example may be used for illustration. The terminology herein is used to describe specific embodiments of the invention, but their usage does not delimit the invention. For example, a BS in the present invention may refer to one of a NB, an eNB, a base transceiver station, a radio BS, and the like and thus they may be used interchangeably throughout the specification and claims as appropriate.

The exemplary embodiments of the present invention provide solutions for detecting UCI HARQ-ACK information multiplexed on a PUSCH to an extent that meets the performance requirements. In the provided solutions, candidate HARQ-ACK symbols which convey relatively more information than bits are formed at a BS (or eNB) side and applied to calculating a plurality of degrees of similarity with an extracted HARQ-ACK symbol sequence received from a UE. Upon comparing a selected one of the plurality of degrees of similarity with a predetermined threshold, it can be determined whether HARQ-ACK information has been transmitted from the UE. In one embodiment, the predetermined threshold as used in the comparison can be calculated based upon an ML detection algorithm. In another embodiment, the predetermined threshold can be calculated based upon a degree of correlation detection algorithm. According to embodiments of the present invention, the numerical value of the predetermined threshold is adaptive and can be calculated on-the-fly without relying upon extensive off-line simulations.

Figure 1:
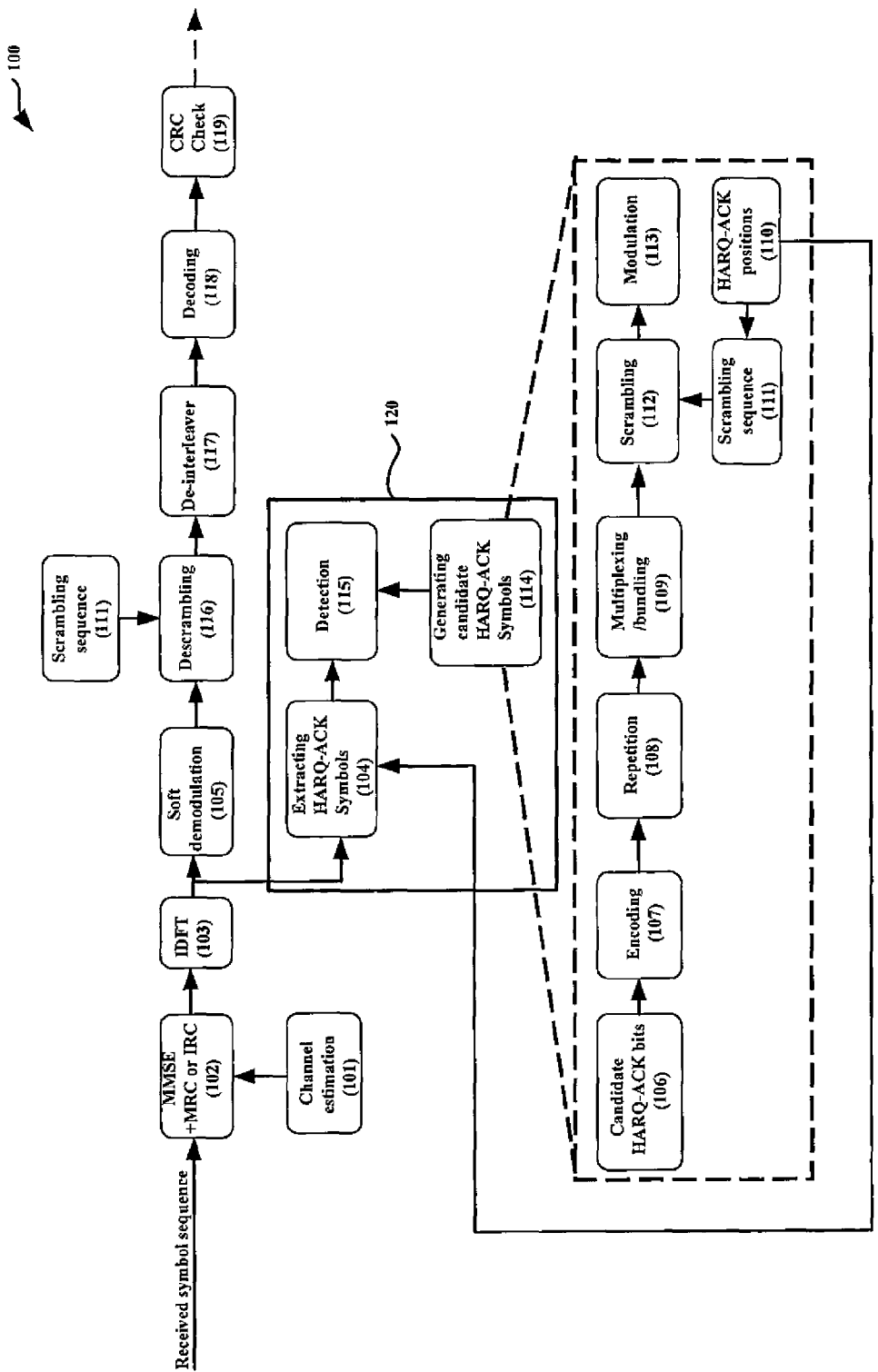
FIG. 1 is a schematic block diagram illustrating a process in which embodiments of the present invention may be implemented.
Figure 2:
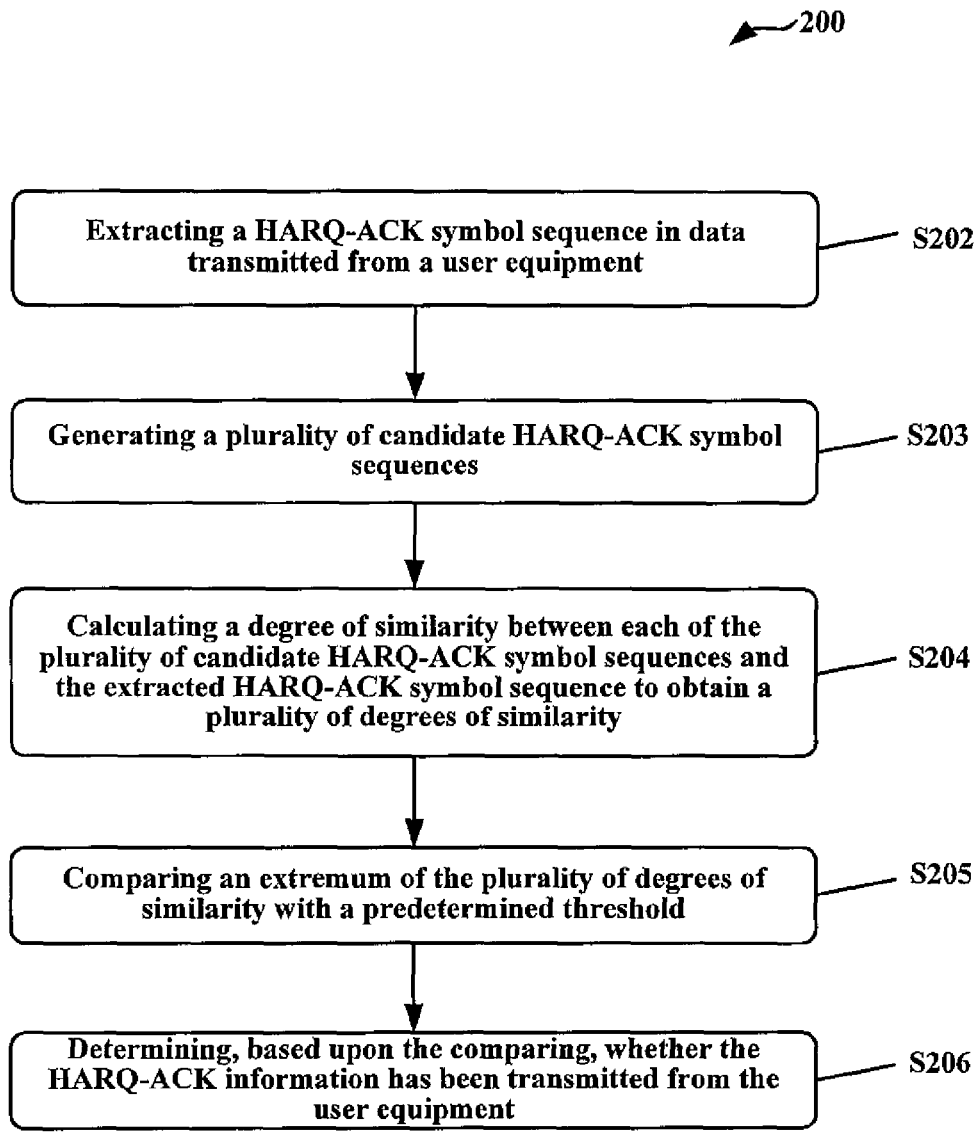
FIG. 2 is a flow chart exemplarily illustrating a method for detecting HARQ-ACK information according to embodiments of the present invention.
Figure 3:
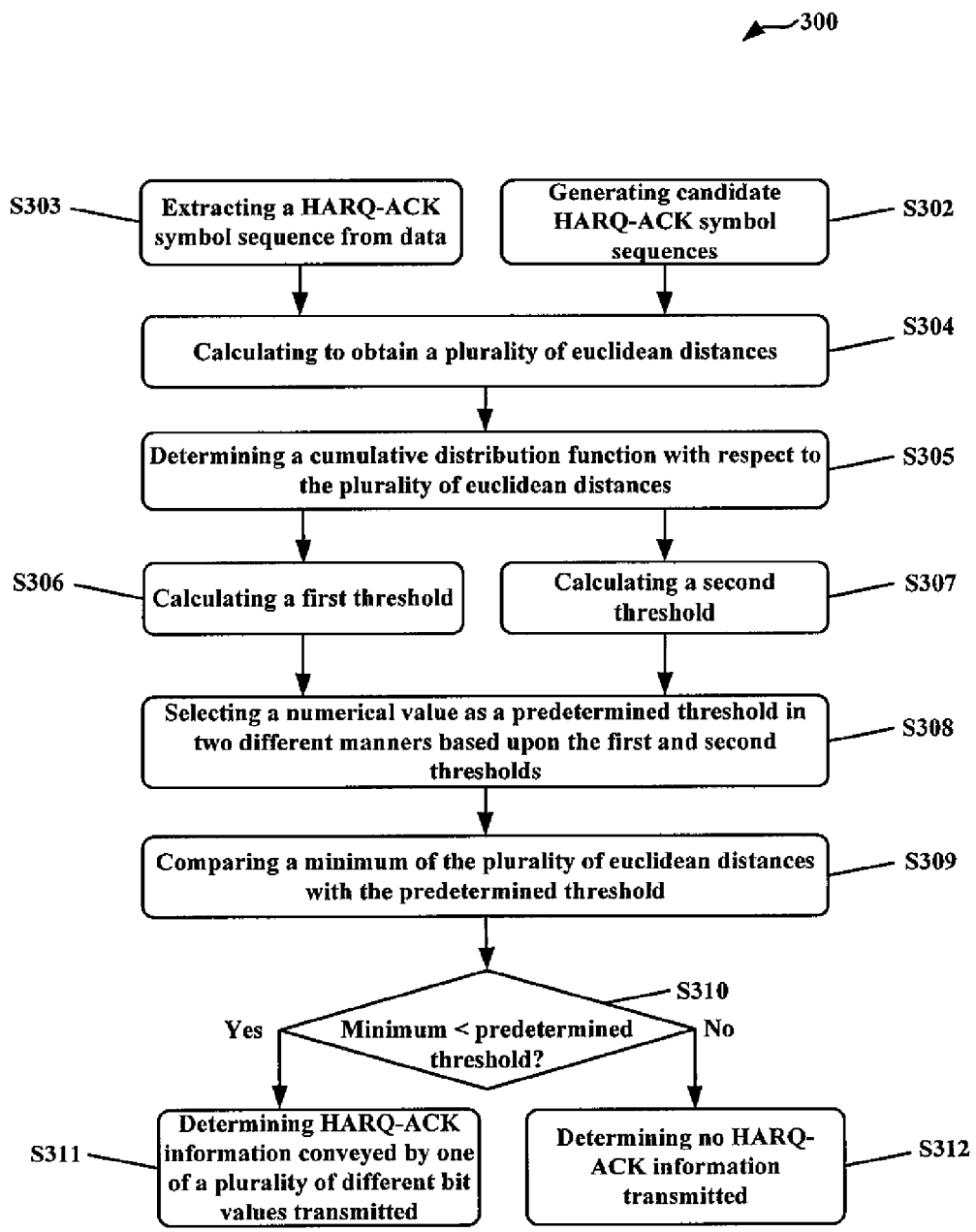
FIG. 3 is a flow chart exemplarily illustrating a method for detecting HARQ-ACK information according to an embodiment of the present invention.
Figure 4:
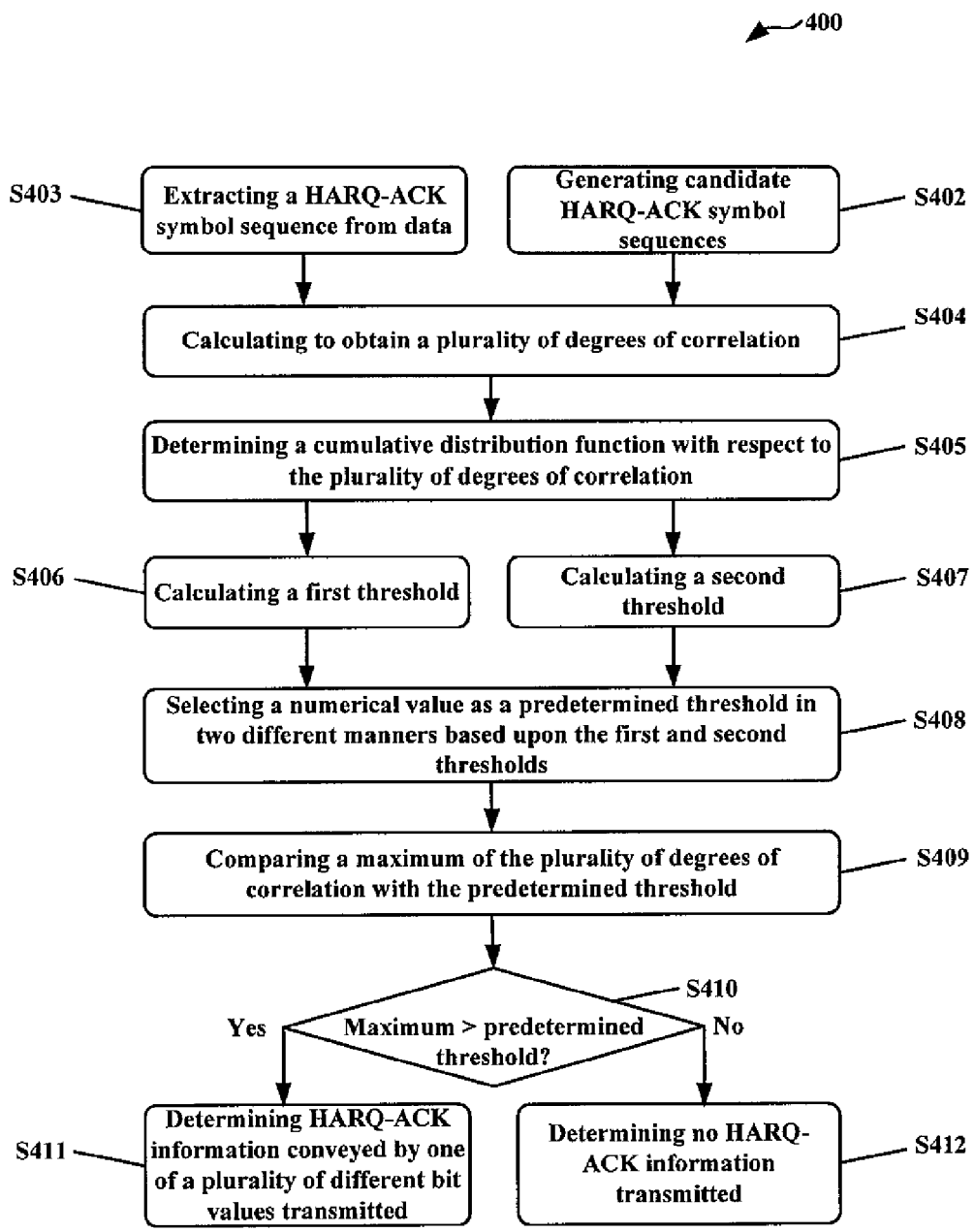
FIG. 4 is a flow chart exemplarily illustrating another method for detecting HARQ-ACK information according to an embodiment of the present invention.
Figure 5:
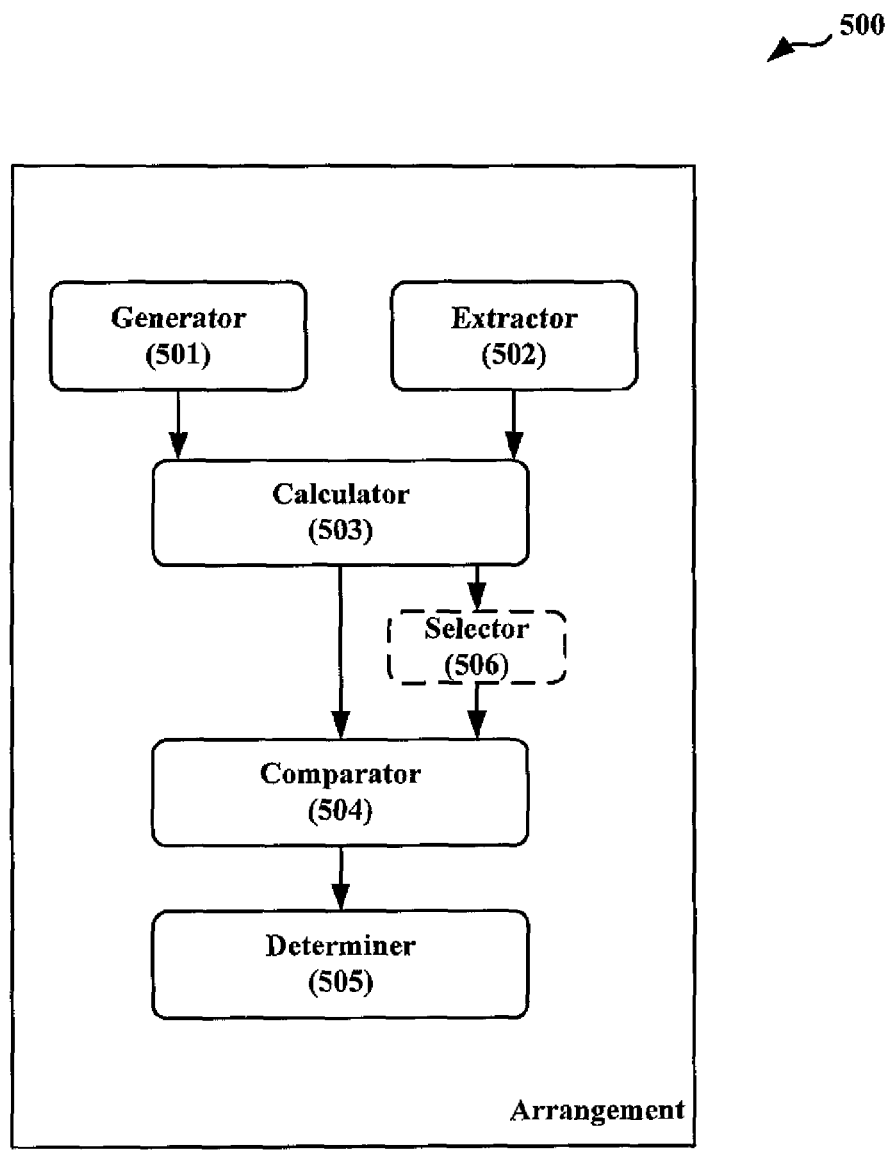
FIG. 5 is a schematic block diagram illustrating an arrangement in a BS for detecting HARQ-ACK information according to embodiments of the present invention.
Figure 6:
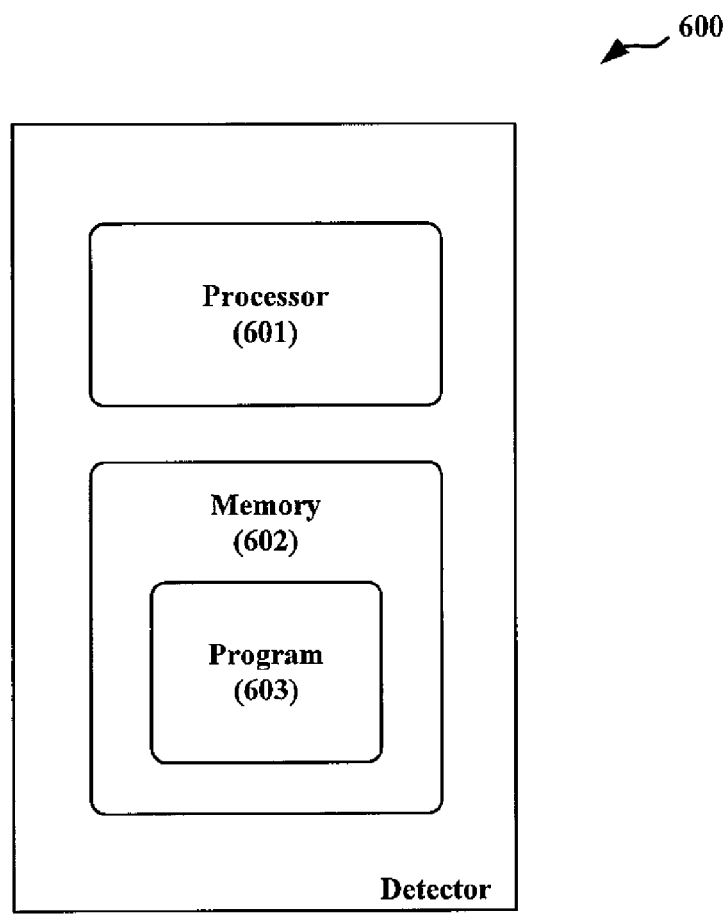
FIG. 6 is a schematic block diagram illustrating a detector for detecting HARQ-ACK information according to an embodiment of the present invention.

FIG. 1 is a schematic block diagram illustrating a process 100 in which embodiments of the present invention may be implemented. As illustrated in FIG. 1, the process 100 starts at block 102, wherein MRC or IRC antenna combining and frequency domain MMSE equalization are performed on the received PUSCH symbol sequences in the frequency domain based upon a channel impulse response resulted from a channel estimation at block 101. Then, the process 100 advances to block 103, at which the symbols in a frequency domain are transformed into a time domain through IDFT transformations and PUSCH data symbols are recovered. Afterwards, the process 100 proceeds to two branches, wherein one branch consists of blocks 105, 111, and 116-119, and the other one consists of blocks 104, 115 and 114, which are further enclosed by a larger block as designated as 120. The block 120 can implement methods 200, 300, and 400 as illustrated in FIGS. 2-4, or can be embodied as an arrangement 500 as illustrated in FIG. 5 or a detector 600 as illustrated in FIG. 6, for detecting HARQ-ACK information according to certain embodiments of the present invention.

When going forward along the branch including blocks 105, 111, and 116-119, the process 100 performs soft demodulation on the recovered PUSCH data symbols to recover PUSCH data bits at block 105 and descrambling the PUSCH data bits at block 116 using a scrambling sequence from block 111. After that, the process 100 performs de-interleaving and channel decoding of the PUSCH data bits at blocks 117 and block 118, respectively, to restore PUSCH transport blocks. Then, the process 100 performs a CRC check at block 119. If the CRC check is successful, then the process 100 may deliver the PUSCH transport blocks as outputs; otherwise, the process 100 indicates a failure of PUSCH reception.

When proceeding with the branch including the block 120, the process 100 extracts, at sub-block 104, HARQ-ACK symbol sequences from the data which has been subject to IDFT processing at block 103. In an embodiment, the process 100 can extract the equalized HARQ-ACK symbols in one subframe according to positions of the HARQ-ACK bits calculated by block 110, which can calculate the positions of HARQ-ACK bits in an output sequence of a channel interleaver (not shown). In other words, the received potential HARQ-ACK symbol sequence can be sorted out from the equalized symbol sequences in one subframe according to the positions of the HARQ-ACK bits and this symbol sequence may have the same number of symbols as that of each candidate HARQ-ACK symbol sequence generated at block 114. Then, the extracted HARQ-ACK symbol sequence is fed to block 115 at which it would be detected using candidate HARQ-ACK symbol sequences as output by block 114. As illustrated in block 114, it mainly generates a plurality of candidate HARQ-ACK symbol sequences through a series of blocks 106-113, as surrounded by a dashed block.

At block 106, possible candidate HARQ-ACK bits or bit combinations, e.g., 1 bit (0 or 1) or 2 bits (00, 01, 10, or 11), are selected based upon a previous DL scheduling assignment, which may indicate how many HARQ-ACK bits are expected at the BS, and then the selected bits or bit combinations are sent to block 107 for encoding. Then, the process 100 performs encoding at block 107, repetition at block 108, multiplexing/bundling at block 109, scrambling at block 112, and modulation at block 113 according to section 5.2.26 in TS 36.212, v9.1.0 (2010-03), wherein the scrambling at block 112 comprises extracting PN bits only for the HARQ-ACK bits from a locally generated PN scrambling sequence based upon the positions of the HARQ-ACK bits calculated at block 110 and then using the PN bits as a scrambling sequence to scramble the output of the block 109. Upon performance of blocks 106-113, a plurality of modulation symbols may be generated at the BS side and these modulation symbols would be regarded as candidate HARQ-ACK symbol sequences in relation to the extracted HARQ-ACK symbol sequence. Then, the plurality of candidate HARQ-ACK symbol sequences are input into block 115, at which the process 100 will perform detection methods according to certain embodiments of the present invention, as will be discussed in more detail with respect to FIGS. 2-4.

It should be noted that operations of some blocks in the process 100 of FIG. 1 have been widely adopted by wireless communications or standardized in the 3GPP LTE system (e.g., soft demodulation, encoding, multiplexing/bundling, decoding, repetition, or scrambling) and thus are not discussed in detail herein for simplicity and avoiding unnecessarily obscuring the present invention.

FIG. 2 is a flow chart exemplarily illustrating a method 200 for detecting HARQ-ACK information according to embodiments of the present invention. As illustrated in FIG. 2, the method 200 extracts a HARQ-ACK symbol sequence in data transmitted from a UE at step S202. Then, the method 200 proceeds to step S203, at which the method 200 generates a plurality of candidate HARQ-ACK symbol sequences, e.g., by performance of processing at blocks 106-113 as illustrated in FIG. 1.

Subsequent to the steps of the extracting and generating, the method 200 advances to step S204, at which the method 200 calculates a degree of similarity between each of the plurality of candidate HARQ-ACK symbol sequences and the extracted HARQ-ACK symbol sequence to obtain a plurality of degrees of similarity. Then, at step S205, the method 200 compares an extremum of the plurality of degrees of similarity with a predetermined threshold. The extremum may be a maximum or minimum as appropriate. Based upon the comparing, the method 200 determines, at step S206, whether the HARQ-ACK information has been transmitted from the UE.

Although not illustrated in FIG. 2, in an embodiment, the method 200 generates the plurality of candidate HARQ-ACK symbol sequences based upon a previous DL scheduling assignment and a previous UL scheduling grant, wherein the previous DL scheduling assignment is used to determine how many HARQ-ACK bits are expected and thereby how many candidate HARQ-ACK symbol sequences should be generated, and the previous UL scheduling grant is used to determine parameters in the generation of candidate HARQ-ACK symbol sequences such as the number of repetition, etc.

In another embodiment, the method 200 calculates a euclidean distance or a degree of correlation between each of the plurality of candidate HARQ-ACK symbol sequences and the extracted HARQ-ACK symbol sequence to form a plurality of euclidean distances or a plurality of degrees of correlation. The detailed calculations for the Euclidean distance and the degree of correlation will be discussed later in connection with FIGS. 3 and 4, respectively.

In an embodiment, the method 200 calculates a first threshold and a second threshold according to a cumulative distribution function with respect to the plurality of euclidean distances or the plurality of degrees of correlation, wherein the first threshold meets a missed detection probability condition of the HARQ-ACK information and the second threshold meets a false detection probability condition of the HARQ-ACK information. The missed detection probability and the false detection probability conditions could be set to 1%, as presented in table 8.2.5.3.1 in 3GPP TS 36.141.

In some embodiments, for the plurality of euclidean distances, the method 200 comprises one of selecting the higher one of the first threshold and the second threshold as the predetermined threshold and selecting a numerical value within an interval bounded by the first threshold and the second threshold as the predetermined threshold. When a result of the comparing at step S205 is that a minimum of the plurality of euclidean distances is lower than the predetermined threshold, the method 200 determines that the HARQ-ACK information conveyed by one of a plurality of different bit values (e.g., 0, 1, 00, 01, 10, 11 or the like) has been transmitted from the UE. When a result of the comparing at step S205 is that a minimum of the plurality of euclidean distances is equal to or higher than the predetermined threshold, the method 200 determines that the HARQ-ACK information has not been transmitted from the UE. In other words, it can be determined that a DTX response may be transmitted from the UE.

In some other embodiments, for the plurality of degrees of correlation, the method 200 comprises one of selecting the lower one of the first threshold and the second threshold as the predetermined threshold and selecting a numerical value within an interval bounded by the first threshold and the second threshold as the predetermined threshold. Different from the euclidean distance related comparing, when a result of the comparing at step S205 is that a maximum of the plurality of degrees of correlation is higher than the predetermined threshold, the method 200 determines that the HARQ-ACK information conveyed by one of a plurality of different bit values has been transmitted from the UE. When a result of the comparing at step S205 is that a maximum of the plurality of degrees of correlation is equal to or lower than the predetermined threshold, the method 200 determines that the HARQ-ACK information has not been transmitted from the UE.

The method 200, as discussed above in conjunction with FIG. 2 and together with various embodiments of the present invention, can fulfill all performance requirements of UCI HARQ-ACK defined in the section 8.6.3 of 3GPP TS 36.14.1. Further, the predetermined threshold for detection of the HARQ-ACK information can be adaptively varied on a subframe-by-subframe basis according to certain factors including, e.g., allocated bandwidth, PUSCH MCS, beta offset, and instantaneous PUSCH SINR. Additionally, the predetermined threshold can be determined via on-the-fly numerical calculations, which lowers the computational costs as compared to conventional excessive off-line simulations.

FIG. 3 is a flow chart exemplarily illustrating a method 300 for detecting HARQ-ACK information according to an embodiment of the present invention. As illustrated in FIG. 3, the method 300 extracts a HARQ-ACK symbol sequence from data transmitted from a UE at step S303. For example, the HARQ-ACK symbol sequence comprising N symbols is extracted from equalized received PUSCH data according to positions of the HARQ-ACK bits indicated by an interleaver at the UE side and extracted by a de-interleaver at a BS side, and the extracted HARQ-ACK symbol sequence may form a sequence expressed as below:

$$\hat{S}=[\hat{s}_1,\ldots,\hat{s}_N], \quad (1)$$

where N is the number of repetition as used at block 108 in FIG. 1. Without loss of generality, it is assumed that a receiver at the BS side performs normalization so that the average signal power of the equalized PUSCH data symbols is 1. Thereby the average power of interference plus noise experienced by PUSCH data symbols is $SINR^{-1}$, i.e., $$P_{ds} = 1$$
$$P_{IN} = \frac{1}{SINR}.$$

In addition to the extracting step S303, the method 300, at step S302, also generates candidate HARQ-ACK symbol sequences at the BS side. In exemplary embodiments of the present invention, it is assumed that the number of ACK/NACK bits per UE is either one or two (or more if possible) and thus the candidate HARQ-ACK bits at the BS side can be expressed as below:

$$\text{For 1 bit case, } b_{possible}^k = \begin{cases} 0 & k=1 \\ 1 & k=2 \end{cases},$$

$$\text{For 2 bits case, } b_{possible}^k = \begin{cases} 00 & k=1 \\ 01 & k=2 \\ 10 & k=3 \\ 11 & k=4 \end{cases}.$$

Due to prior knowledge, e.g., a number of streams, the BS (or eNB) can select different $b_{possible}^k$ for different bit cases. For example, the BS can select $b_{possible}^k$ of 1 bit case if only one stream has been used in transmission and $b_{possible}^k$ of 2 bits case if two streams have been used in transmission. Then, a plurality of candidate HARQ-ACK symbol sequences can be generated through a proper performance of the encoding, repetition, multiplexing or bundling, scrambling, and modulation as illustrated in FIG. 1 by blocks 107-113 according to section 5.2.2.6 of 3GPP TS 36.212, V9.1.0 (2010-03) and can be mathematically expressed by the following equation:

$$\hat{d}^k = f(b_{possible}^k) = [\hat{d}_1^k,\ldots,\hat{d}_N^k] \quad (2),$$

where $\hat{d}^k$ is a set of the generated HARQ-ACK symbol sequences from the candidate HARQ-ACK bit $b_{possible}^k$, N is the length of $\hat{d}^k$ and equal to the number of repetition, $f(\bullet)$ is a generation function constructed from the above encoding, repetition, multiplexing or bundling, scrambling, and modulation processing. It should be noted that the number of repetition is the same as that of coded symbols for HARQ-ACK information, which is specified in section 5.2.2.6 of 3GPP TS 36.212 v9.1.0 (2010-03) and reproduced as follows for reference.

$$N = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{sc}^{PUSCH}\right).$$

The constellation of PUSCH data symbols has unit power. Since HARQ-ACK symbols generally occupy the outermost constellation points for PUSCH data symbols, their power is equal to or higher than 1 and thus can be given as follows with respect to different modulation manners:

$$P_{PUSCH} = 1$$
$$P_{HARQ-ACK} = |\hat{d}^k|^2$$

$$\text{where } |\hat{d}^k|^2 = \begin{cases} 1, & QPSK \\ 1.3417, & 16QAM \\ 1.5275, & 64QAM \end{cases}.$$

Returning back to FIG. 3, subsequent to generating the candidate HARQ-ACK symbol sequences, the method 300 proceeds to step S304, at which the method 300 calculates a euclidean distance between each of the plurality of candidate HARQ-ACK symbol sequences and the extracted HARQ-ACK symbol sequence to form a plurality of euclidean distances, which can be mathematically derived and expressed as follows:

$$I_k = \sum_{n=1}^{N} |\hat{S}_n - \hat{d}_n^k|^2 \qquad (3)$$

$$= \sum_{n=1}^{N} |D_n^k|^2$$

$$= [I_1, \ldots, I_M],$$

where k=1, ... M, M may be equal to 2 for a 1 bit case and 4 for a 2 bits case, $I_1, \ldots, I_M$ each stand for a euclidean distance between a candidate HARQ-ACK symbol sequence $\hat{d}^k$ and the extracted HARQ-ACK symbol sequence $\hat{S}$.

All things being equal, upon completion of calculating a plurality of euclidean distances, the method 300 advances to step S305, at which the method 300 determines a cumulative distribution function with respect to the plurality of euclidean distances. Below are discussions regarding how to mathematically derive the cumulative distribution function.

Based upon calculations of the euclidean distances in equation (3) and characteristics of probability distributions, the resulting $D_n^k$ complies with a complex normal distribution and its means and variance can be expressed as follows based upon the presence or absence of the HARQ-ACK information (or symbol):

if the HARQ-ACK information is present, then it can be given that:

$$E[D] = 0$$

$$\text{Var}[D] = P_{IN} = \frac{1}{SINR},$$

if the HARQ-ACK information is absent, i.e., the PUSCH data symbols are present, then it can be given that:

$$E[D] = 0$$

$$\text{Var}[D] = P_{IN} + P_{ds} + P_{HARQ-ACK} = \frac{1}{SINR} + 1 + |\hat{d}|^2,$$

where SINR is directed to an SINR of the recovered PUSCH data symbols in a time domain.

Correspondingly, the resulting $I_k$ as expressed in equation (3) complies with chi-square distribution with 2N degrees of freedom and its corresponding cumulative distribution function can be constructed as below:

$$F_I(i) = F\left(\frac{i}{\text{Var}[D]}, N\right). \qquad (4)$$

Further, set $y = F(x, N) = 1 - e^{-x} \sum_{n=0}^{N-1} \frac{1}{n!} x^n, x \geq 0,$ \qquad (5)

and an inverse function corresponding to the function y can be expressed as $$x = F^{-1}(y, N), \qquad (6)$$

where the correspondences between x and y could be stored as look-up tables for easy search. Additionally, the equation (5) may be derived from the equation (2-1-114) as included in Digital Communications (Fourth Edition), which is reproduced as below for reference:

$$F_Y(y) = 1 - e^{-y/2\sigma^2} \sum_{k=0}^{m-1} \frac{1}{k!} \left(\frac{y}{2\sigma^2}\right)^k \qquad (y \geq 0) \qquad (2\text{-}1\text{-}114)$$

Following determination of the cumulative distribution function as expressed by equation (4), the method 300 proceeds to step S306, at which the method 300 calculates a first threshold which meets a missed detection probability condition of the HARQ-ACK information by an inequation as expressed as follows:

$$P\{ACK \to DTX\} = 1 - F\left(\frac{I_{threshold1}}{\frac{1}{SINR}}, N\right) \leq p_1, \qquad (7)$$

where P{ACK→DTX} stands for a missed detection probability and it should be lower than or equal to $p_1$, which may be set to 1% as specified by 3GPP TS 36.141, v9.6.0, section 8.2.3, $I_{threshold1}$ denotes the first threshold which can be calculated as follows according to the equation (6) and the inequation (7):

$$I_{threshold1} = F^{-1}(1 - p_1, N) \cdot \frac{1}{SINR}. \qquad (8)$$

Similarly, the method 300 calculates, at step S307, a second threshold which meets a false detection probability condition of the HARQ-ACK information by an inequation as expressed as follows:

$$P\{DTX \to ACK\} = F\left(\frac{I_{threshold2}}{\frac{1}{SINR} + 1 + |\hat{d}|^2}, N\right) \leq p_2, \qquad (9)$$

where P{DTX→ACK} stands for a false alarm detection probability and it should be lower than or equal to $p_2$, which may be set to 1% as specified by 3GPP TS 36.141, v9.6.0, section 8.2.3, $I_{threshold2}$ denotes the second threshold which may be calculated as follows according to the equation (6) and the inequation (9):

$$I_{threshold2} = F^{-1}(p_2, N) \cdot \left(\frac{1}{SINR} + 1 + |\hat{d}|^2\right) > F^{-1}(p_2, N) \cdot \left(1 + |\hat{d}|^2\right). \qquad (10)$$

After calculating the first and second thresholds, the method 300 proceeds to step S308, at which the method 300 selects a numerical value as a predetermined threshold in two different manners based upon the first and second thresholds. In one manner, the method 300 selects the higher one of the first and second thresholds as the predetermined threshold for later comparison. The reasons why the higher one is preferred are that the missed detection performance is more important than the false alarm performance since the DTX case, i.e., absence of the HARQ-ACK information, is mainly caused by the missed scheduling assignment on the PDCCH and its occurrence is less frequent. Thus, the performance margin had better be reserved for the missed detection.

In another manner, the method 300 selects a numerical value within an interval bounded by the first threshold and the second threshold as the predetermined threshold, i.e., $I_{threshold1} \leq I_{threshold} \leq I_{threshold2}$, $I_{threshold}$ refers to the predetermined threshold.

Upon determination of the predetermined threshold, the method 300 proceeds to step S309, at which the method 300 compares a minimum of the plurality of euclidean distances with the predetermined threshold. Then, at step S310, the method 300 determines whether the minimum is lower than the predetermined threshold. If the minimum is lower than the predetermined threshold, then the method 300 switches to step S311, at which the method 300 determines that the HARQ-ACK information conveyed by one of a plurality of different bit values has been transmitted from the UE. For example, it can be determined that the HARQ-ACK information is embodied as a bit value of 0 or 1 for a 1 bit case or as one of bit values of 00, 01, 10, and 11 for a 2 bits case. If the minimum is equal to or higher than the predetermined threshold, then the method 300 switches to step S312, at which the method 300 determines that the HARQ-ACK information has not been transmitted from the UE. In other words, a DTX response has been received by the eNB.

The required parameters in the above euclidean distance based method 300, such as N and $|\hat{d}|$, are known during the baseband processing by the eNB. Further, the SINR related to the PUSCH is a quantity that the eNB needs to estimate during the baseband processing anyhow for UL adaptation and/or UL closed-loop power control. Additionally, $p_1$ and $p_2$ are two parameters that are tuneable for achieving desired performance and they can be straightforwardly set to 1% by default. Therefore, the method 300 does not bring about excessive calculations and calculations as performed can be completed on-the-fly and thus the resulting predetermined threshold is adaptive to the varying channel conditions.

It should be noted herein that the steps and execution orders as illustrated in FIG. 3 are only examples and are not restrictive to the present invention. Those skilled in the art, after reading the present specification, can change these steps, for example, by omitting, combining, or adding certain steps, changing the execution order of certain steps so as to adapt to different application demands. For example, although steps S303 and S302 are illustrated in a parallel manner, both steps could be performed in any order as needed. This also holds true for steps S306 and S307.

FIG. 4 is a flow chart exemplarily illustrating another method 400 for detecting HARQ-ACK information according to an embodiment of the present invention. As illustrated in FIG. 4, the method 400 proceeds in a parallel manner to steps S402 and S403, at which candidate HARQ-ACK symbol sequences are generated at a BS (or eNB) and a HARQ-ACK symbol sequence is extracted from data sent from a UE, respectively. Since operations in relation to steps S402 and S403 are substantively the same as those to steps S302 and S303, detailed description thereof is omitted herein for simplicity.

Subsequent to steps S402 and S403, the method 400 proceeds to step S404, at which the method 400 calculates a degree of correlation between each of the plurality of candidate HARQ-ACK symbol sequences and the extracted HARQ-ACK symbol sequence to form a plurality of degrees of correlation, which can be mathematically derived and expressed as follows:

$$I_k = \frac{1}{N} \sum_{n=1}^{N} Re\left(\hat{S}_n \cdot \frac{(\hat{d}_n^k)^*}{|\hat{d}|^2}\right) = [I_1, \ldots, I_M] \quad (11)$$

where k=1, ... M, M may be equal to 2 for a 1 bit case and 4 for a 2 bits case, $I_1, \ldots, I_M$ each stand for a degree of correlation between a candidate HARQ-ACK symbol sequence $\hat{d}^k$ and the extracted HARQ-ACK symbol sequence $\hat{S}$.

Upon calculating a plurality of degrees of correlation, the method 400 advances to step S405, at which the method 400 determines a cumulative distribution function with respect to the plurality of degrees of correlation. Below are discussions regarding how to mathematically derive the cumulative distribution function.

Based upon calculations of the degrees of correlation in equation (11) and characteristics of probability distributions, the resulting $I_k$ complies with a normal distribution and its means and variance can be expressed as follows based upon the presence or absence of the HARQ-ACK information (or symbol):

if the HARQ-ACK information is present, then it can be given that:

$$E[I] = 1$$
$$Var[I] = \frac{1}{2} \cdot \frac{1}{N} \cdot \frac{1}{SINR} \cdot \frac{1}{|\hat{d}|^2}$$

if the HARQ-ACK information is absent, i.e., the PUSCH data symbols are present, then it can be given that:

$$E[I] = 0$$
$$Var[I] = \frac{1}{2} \cdot \frac{1}{N} \cdot \frac{1}{SINR} \cdot (1 + SINR) \cdot \frac{1}{|\hat{d}|^2}$$

Correspondingly, a cumulative distribution function with respect to $I_k$ can be constructed as below:

$$F_I(i) = 1 - Q\left(\frac{i - E[I]}{\sqrt{Var[I]}}\right) \quad (12)$$
$$= Q\left(\frac{-(i - E[I])}{\sqrt{Var[I]}}\right).$$

Further, set $y = Q(x) = \frac{1}{\sqrt{2\pi}} \int_{\infty}^{\infty} e^{-\frac{t^2}{2}} dt,$ \quad (13)

and an inverse function corresponding to the function y can be expressed as $$x = Q^{-1}(y), \quad (14)$$

where the correspondences between x and y could be stored as look-up tables for easy search.

Following determination of the cumulative distribution function as expressed by equation (12), the method 400 proceeds to step S406, at which the method 400 calculates a first threshold which meets a missed detection probability condition of the HARQ-ACK information by an inequation as expressed as follows:

$$P\{ACK \to DTX\} = Q(-(I_{threshold1}-1)\sqrt{2 \cdot N \cdot SINR \cdot |\hat{a}|^2}) \le p_1, \quad (15)$$

where P{ACK→DTX} stands for a missed detection probability and it should be lower than or equal to $p_1$, which may be set to 1% as specified by 3GPP TS 36.141, v9.6.0, section 8.2.3, $I_{threshold1}$ denotes the first threshold which may be calculated as follows according to the equation (12) and the inequation (15):

$$I_{threshold1} = 1 - \frac{Q^{-1}(p_1)}{\sqrt{2 \cdot N \cdot SINR \cdot |\hat{a}|^2}}. \quad (16)$$

Similarly, the method 400 calculates, at step S407, a second threshold which meets a false alarm detection probability condition of the HARQ-ACK information by an inequation as expressed as follows:

$$P\{DTX \to ACK\} = Q\left(I_{threshold2}\sqrt{\frac{2 \cdot N \cdot SINR \cdot |\hat{a}|^2}{1 + SINR}}\right) \le p_2, \quad (17)$$

where P{DTX→ACK} stands for a false alarm detection probability and it should be lower than or equal to $p_2$, which may be set to 1% as specified by 3GPP TS 36.141, v9.6.0, section 8.2.3, $I_{threshold2}$ denotes the second threshold which may be calculated as follows according to the equation (12) and the inequation (17):

$$I_{threshold2} = \frac{Q^{-1}(p_2)}{\sqrt{2 \cdot N \cdot SINR \cdot |\hat{a}|^2}} \cdot \sqrt{1+SINR} > \frac{Q^{-1}(p_2)}{\sqrt{2 \cdot N \cdot |\hat{a}|^2}}. \quad (18)$$

After calculating the first and second thresholds, the method 400 proceeds to step S408, at which the method 400 selects a numerical value as a predetermined threshold in two different manners based upon the first and second thresholds. In one manner, the method 400 selects the lower one of the first and second thresholds as the predetermined threshold for later comparison. The reason why the lower one is preferred is the same as discussed with respect to the higher one selected in the method 300, i.e., reserving the performance margin for the missed detection. In another manner, the method 400 selects a numerical value within an interval bounded by the first threshold and the second threshold as the predetermined threshold, i.e., $I_{threshold1} \le I_{threshold} \le I_{threshold2}$, $I_{threshold}$ refers to the predetermined threshold.

Upon determination of the predetermined threshold, the method 400 proceeds to step S409, at which the method 400 compares a maximum of the plurality of degrees of correlation with the predetermined threshold. Then, at step S410, the method 400 determines whether the maximum is higher than the predetermined threshold. If the maximum is higher than the predetermined threshold, then the method 400 switches to step S411, at which the method 400 determines that the HARQ-ACK information conveyed by one of a plurality of different bit values has been transmitted from the UE. For example, it can be determined that the HARQ-ACK information is embodied as a bit value of 0 or 1 for a 1 bit case or as one of bit values of 00, 01, 10, and 11 for a 2 bits case. If the maximum is equal to or lower than the predetermined threshold, then the method 400 switches to step S412, at which the method 400 determines that the HARQ-ACK information has not been transmitted from the UE. In other words, a DTX response has been received by the eNB.

Similar to the method 300 as discussed before, due to easy determination of the required parameters in the course of the detection, the method 400 does not bring about excessive calculations and calculations as performed can be completed on-the-fly and thus the resulting predetermined threshold is adaptive to the varying channel conditions.

Below is a table that illustrates simulation results obtained by the method 300 according to embodiments of the present invention and conducted with respect to some test cases defined in Table 8.2.3.5-1 in 3GPP TS 36.141, which is incorporated herein by reference. Further, in the simulations, the parameters $p_1$ and $p_2$ as expressed in the inequations (7) and (9) are respectively preset to 0.5% and 1.0% in determining the value of the predetermined $I_{threshold}$.

| Some test cases defined in Table 8.2.3.5-1 in TS 36.141 | Requirement | | Performance | |
| --- | --- | --- | --- | --- |
| | ACK->DTX | DTX->ACK | ACK->DTX | DTX->ACK |
| A4-3, EVA5, $I_{offset}^{HARQ-ACK}$ = 5, SNR = 14.2 dB | <1% | <1% | 0.2% | 0.7% |
| A4-4, EVA5, $I_{offset}^{HARQ-ACK}$ = 5, SNR = 13.7 dB | <1% | <1% | 0 | 0.74% |
| A4-5, EVA5, $I_{offset}^{HARQ-ACK}$ = 5, SNR = 13 dB | <1% | <1% | 0.04% | 0.78% |
| A4-6, EVA5, $I_{offset}^{HARQ-ACK}$ = 5, SNR = 13 dB | <1% | <1% | 0 | 0.68% |
| A4-7, EVA5, $I_{offset}^{HARQ-ACK}$ = 5, SNR = 12.6 dB | <1% | <1% | 0 | 0.84% |
| A4-8, EVA5, $I_{offset}^{HARQ-ACK}$ = 5, SNR = 12.5 dB | <1% | <1% | 0 | 0.8% |
| A4-3, ETU70, $I_{offset}^{HARQ-ACK}$ = 5, SNR = 14.4 dB | <1% | <1% | 0.12% | 0.76% |
| A4-4, ETU70, $I_{offset}^{HARQ-ACK}$ = 5, SNR = 13.5 dB | <1% | <1% | 0.08% | 0.74% |

As seen from the above simulation results, the test cases are all passed through with remarkable performance margins, especially for the missed detection performance which should take precedence over the false alarm detection performance for reasons as discussed before.

FIG. 5 is a schematic block diagram illustrating an arrangement 500 in a base station for detecting HARQ-ACK information according to embodiments of the present invention. As illustrated in FIG. 5, the arrangement 500 comprises an extractor 502, a generator 501, a calculator 503, a comparator 504, and a determiner 505, wherein the extractor is for extracting a HARQ-ACK symbol sequence in data transmitted from a UE, as discussed above in connection with block 104 in FIG. 1 and steps S202, S303, and S403 in FIGS. 2-4; the generator 501 is for generating a plurality of candidate HARQ-ACK symbol sequences, as discussed above in connection with block 114 in FIG. 1 and steps S203, S302, and S402 in FIGS. 2-4; the calculator 503 is for calculating a degree of similarity between each of the plurality of candidate HARQ-ACK symbol sequences and the extracted HARQ-ACK symbol sequence to obtain a plurality of degrees of similarity, as discussed above in connection with step S204, S304 and S404 in FIGS. 2-4; the comparator 504 is for comparing an extremum of the plurality of degrees of similarity with a predetermined threshold, as discussed above in connection with steps S205, S309, and S409 in FIGS. 2-4; and the determiner 505 is for determining, based upon the comparing, whether the HARQ-ACK information has been transmitted from the UE, as discussed above in connection with steps S206, S311, S312, S411, and S412 in FIGS. 2-4.

In one embodiment, the generator 501 is configured to generate the plurality of candidate HARQ-ACK symbol sequences based upon a previous downlink scheduling assignment and a previous uplink scheduling grant.

In another embodiment, the calculator 503 is configured to calculate a euclidean distance or a degree of correlation between each of the plurality of candidate HARQ-ACK symbol sequences and the extracted HARQ-ACK symbol sequence to form a plurality of euclidean distances or a plurality of degrees of correlation. Further, the calculator 503 is configured to calculate a first threshold and a second threshold according to a cumulative distribution function with respect to the plurality of euclidean distances or the plurality of degrees of correlation, wherein the first threshold meets a missed detection probability condition of the HARQ-ACK information and the second threshold meets a false detection probability condition of the HARQ-ACK information.

In a further embodiment, for the plurality of euclidean distances, the arrangement 500 comprises a selector 506, which is illustrated in dashed lines, configured to perform one of selecting the higher one of the first threshold and the second threshold as the predetermined threshold and selecting a numerical value within an interval bounded by the first threshold and the second threshold as the predetermined threshold.

In one embodiment, if the result of the comparator 504 is that a minimum of the plurality of euclidean distances is lower than the predetermined threshold, the determiner 505 is configured to determine that the HARQ-ACK information conveyed by one of a plurality of different bit values has been transmitted from the UE. In contrast, if the result of the comparator 504 is that a minimum of the plurality of euclidean distances is equal to or higher than the predetermined threshold, and the determiner 505 is configured to determine that the HARQ-ACK information has not been transmitted from the UE.

In a further embodiment, for the plurality of degrees of correlation, the selector 506 is configured to perform one of selecting the lower one of the first threshold and the second threshold as the predetermined threshold and selecting a numerical value within an interval bounded by the first threshold and the second threshold as the predetermined threshold.

In an embodiment, if the result of the comparator 504 is that a maximum of the plurality of degrees of correlation is higher than the predetermined threshold, the determiner 505 is configured to determine that the HARQ-ACK information conveyed by one of a plurality of different bit values has been transmitted from the UE. In contrast, if the result of the comparator 504 is that a maximum of the plurality of degrees of correlation is equal to or lower than the predetermined threshold, the determiner 505 is configured to determine that the HARQ-ACK information has not been transmitted from the UE.

It can be understood from the above discussions that the arrangement 500 can be executed for performance of the steps as recited in methods 200, 300, and 400. Likewise, by means of the arrangement 500, the HARQ-ACK information or symbols that are multiplexed on the PUSCH can be detected efficiently and accurately without excessive link level simulations for obtaining a proper predetermined threshold.

FIG. 6 is a schematic block diagram illustrating a detector 600 for detecting HARQ-ACK information according to an embodiment of the present invention. As illustrated in FIG. 6, the detected 600 comprises at least one processor 601 and at least one memory 602 storing program 603 of computer executable instructions, wherein the computer executable instructions are configured, with the at least one processor 601, to cause the detector 600 to at least perform according to the methods 200, 300, and 400 as discussed before.

Generally, the processor 601 is a central processing unit, but it may be an additional operation processor. The processor 601 may comprise a computer processor, application-specific integrated circuit (ASIC), field-programmable gate array (FPGA), and/or other hardware components that have been programmed in such a way to carry out embodiments of the present invention as discussed previously.

The memory 602 may include volatile and/or non-volatile memory and typically stores content, data, or the like. For example, the memory 602 may store computer program instructions such as software applications (for example for the entities as included in the arrangement 500) or operating systems, information, data, content, or the like for the processor 601 to perform steps associated with operation of the arrangement 500 or the detector 600 in accordance with embodiments. The memory may be, for example, random access memory (RAM), a hard drive, or other fixed data memory or storage device.

The techniques described herein may be implemented by various means so that an apparatus implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g., procedures, functions, and so on) that perform the functions described herein.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for detecting hybrid automatic repeat request acknowledgement (HARQ-ACK) information, the method comprising:

extracting a HARQ-ACK symbol sequence in data transmitted from a user equipment;

generating a plurality of candidate HARQ-ACK symbol sequences;

calculating a degree of similarity between each of the plurality of candidate HARQ-ACK symbol sequences and the extracted HARQ-ACK symbol sequence to obtain a plurality of degrees of similarity;

comparing an extremum of the plurality of degrees of similarity with a predetermined threshold;

determining, based upon the comparing, whether the HARQ-ACK information has been transmitted from the user equipment.

2. The method of claim 1, wherein the generating comprises generating the plurality of candidate HARQ-ACK symbol sequences based upon a previous downlink scheduling assignment and a previous uplink scheduling grant.

3. The method of claim 1, wherein the calculating the degree of similarity comprises calculating a Euclidean distance or a degree of correlation between each of the plurality of candidate HARQ-ACK symbol sequences and the extracted HARQ-ACK symbol sequence to form a plurality of Euclidean distances or a plurality of degrees of correlation.

4. The method of claim 3:

wherein the calculating comprises calculating a first threshold and a second threshold according to a cumulative distribution function with respect to the plurality of Euclidean distances or the plurality of degrees of correlation;

wherein the first threshold meets a missed detection probability condition of the HARQ-ACK information and the second threshold meets a false detection probability condition of the HARQ-ACK information.

5. The method of claim 4, wherein for the plurality of Euclidean distances, the method comprises one of the following:

selecting the higher one of the first threshold and the second threshold as the predetermined threshold;

selecting a numerical value within an interval bounded by the first threshold and the second threshold as the predetermined threshold.

6. The method of claim 5:

wherein a result of the comparing step is that a minimum of the plurality of Euclidean distances is lower than the predetermined threshold;

wherein the determining step comprises determining that the HARQ-ACK information conveyed by one of a plurality of different bit values has been transmitted from the user equipment.

7. The method of claim 5:

wherein a result of the comparing step is that a minimum of the plurality of Euclidean distances is equal to or higher than the predetermined threshold;

wherein the determining step comprises determining that the HARQ-ACK information has not been transmitted from the user equipment.

8. The method of claim 4, wherein for the plurality of degrees of correlation, the method comprises one of the following:

selecting the lower one of the first threshold and the second threshold as the predetermined threshold;

selecting a numerical value within an interval bounded by the first threshold and the second threshold as the predetermined threshold.

9. The method of claim 8:

wherein a result of the comparing is that a maximum of the plurality of degrees of correlation is higher than the predetermined threshold;

wherein the determining comprises determining that the HARQ-ACK information conveyed by one of a plurality of different bit values has been transmitted from the user equipment.

10. The method of claim 8:

wherein a result of the comparing is that a maximum of the plurality of degrees of correlation is equal to or lower than the predetermined threshold;

wherein the determining comprises determining that the HARQ-ACK information has not been transmitted from the user equipment.

11. An arrangement in a base station for detecting hybrid automatic repeat request acknowledgement (HARQ-ACK) information, comprising:

memory;

one or more processing circuits operative connected to the memory and configured to function as:

an extractor circuit configured to extract a HARQ-ACK symbol sequence in data transmitted from a user equipment;

a generator circuit configured to generate a plurality of candidate HARQ-ACK symbol sequences;

a calculator circuit configured to calculate a degree of similarity between each of the plurality of candidate HARQ-ACK symbol sequences and the extracted HARQ-ACK symbol sequence to obtain a plurality of degrees of similarity;

a comparator configured to compare an extremum of the plurality of degrees of similarity with a predetermined threshold;

a determiner circuit configured to determine, based upon the comparison, whether the HARQ-ACK information has been transmitted from the user equipment.

12. The arrangement of claim 11, wherein the generator circuit is configured to generate the plurality of candidate HARQ-ACK symbol sequences based upon a previous downlink scheduling assignment and a previous uplink scheduling grant.

13. The arrangement of claim 11, wherein the calculator circuit is configured to calculate a Euclidean distance or a degree of correlation between each of the plurality of candidate HARQ-ACK symbol sequences and the extracted HARQ-ACK symbol sequence to form a plurality of Euclidean distances or a plurality of degrees of correlation.

14. The arrangement of claim 13:

wherein the calculator circuit is configured to calculate a first threshold and a second threshold according to a cumulative distribution function with respect to the plurality of Euclidean distances or the plurality of degrees of correlation;

wherein the first threshold meets a missed detection probability condition of the HARQ-ACK information and the second threshold meets a false detection probability condition of the HARQ-ACK information.

15. The arrangement of claim 14, wherein for the plurality of Euclidean distances, the arrangement comprises a selector circuit configured to perform one of the following:

select the higher one of the first threshold and the second threshold as the predetermined threshold;

select a numerical value within an interval bounded by the first threshold and the second threshold as the predetermined threshold.

16. The arrangement of claim 15, wherein, in response to the comparator indicating that a minimum of the plurality of Euclidean distances is lower than the predetermined threshold, the determiner circuit is configured to determine that the HARQ-ACK information conveyed by one of a plurality of different bit values has been transmitted from the user equipment.

17. The arrangement of claim 15, wherein, in response to the comparator indicating that a minimum of the plurality of Euclidean distances is equal to or higher than the predetermined threshold, the determiner circuit is configured to determine that the HARQ-ACK information has not been transmitted from the user equipment.

18. The arrangement of claim 14, wherein for the plurality of degrees of correlation, the arrangement comprises a selector circuit configured to perform one of the following:
   select the lower one of the first threshold and the second threshold as the predetermined threshold;
   select a numerical value within an interval bounded by the first threshold and the second threshold as the predetermined threshold.

19. The arrangement of claim 18, wherein, in response to the comparator indicating that a maximum of the plurality of degrees of correlation is higher than the predetermined threshold, the determiner circuit is configured to determine that the HARQ-ACK information conveyed by one of a plurality of different bit values has been transmitted from the user equipment.

20. The arrangement of claim 18, wherein, in response to the comparator indicating that a maximum of the plurality of degrees of correlation is equal to or lower than the predetermined threshold, the determiner circuit is configured to determine that the HARQ-ACK information has not been transmitted from the user equipment.

* * * * *

UNITED STATES PATENT AND TRADEMARK OFFICE
CERTIFICATE OF CORRECTION

PATENT NO. : 9,319,185 B2
APPLICATION NO. : 14/401705
DATED : April 19, 2016
INVENTOR(S) : Wang et al.

It is certified that error appears in the above-identified patent and that said Letters Patent is hereby corrected as shown below:

In the specification

In Column 1, Line 19, delete "arc defined" and insert -- are defined --, therefor.

In Column 1, Line 36, delete "MSC" and insert -- MCS --, therefor.

In Column 1, Line 38, delete "Dedicated" and insert -- Downlink --, therefor.

In Column 8, Line 56, delete " where $|\hat{d}^k|^2$ " and insert -- where $|\hat{d}^k|$ --, therefor.

Signed and Sealed this
Twenty-third Day of August, 2016

Michelle K. Lee
*Director of the United States Patent and Trademark Office*